United States Patent [19]
Suzuki et al.

[11] Patent Number: 5,841,750
[45] Date of Patent: Nov. 24, 1998

[54] INFORMATION PLAYBACK APPARATUS

[75] Inventors: Shiro Suzuki, Zama; Isao Kimura, Tokyo, both of Japan; Daniel Wu, Cerritos, Calif.

[73] Assignees: Asahi Kasei Microsystems Co., Ltd.; Nikon Corporation, both of Tokyo, Japan

[21] Appl. No.: 842,887

[22] Filed: Apr. 17, 1997

Related U.S. Application Data

[60] Provisional application No. 60/015,645 Apr. 19, 1996.
[51] Int. Cl.$^6$ .................................................. G11B 7/00
[52] U.S. Cl. ............................... 369/59; 369/50; 369/48
[58] Field of Search .................................. 369/59, 47, 48, 369/49, 50, 54, 58, 60, 32, 13; 360/48, 51, 53

[56] References Cited

U.S. PATENT DOCUMENTS 5,519,683  5/1996  Mizokami et al. ........................ 369/59
5,680,380  10/1997  Taguchi et al. ........................ 369/59 X Primary Examiner—Muhammad N. Edun
Attorney, Agent, or Firm—Oliff & Berridge, PLC

[57] ABSTRACT

An information playback apparatus includes a clock combining circuit having a FIFO circuit, a signal combining circuit and a signal selecting circuit. The FIFO circuit accepts, for example, a positive-edge playback signal RDATA0 that has as data the positive edge of a playback signal obtained from recording domains formed in a recording medium, RDATA0 being synchronized with a positive-edge clock signal RCLK0. The FIFO circuit also accepts a negative-edge playback signal RDATA1 that has as data the negative edge of the playback signal, RDATA1 being synchronized with a negative-edge clock signal RCLK1. The FIFO circuit causes RDATA0 and RDATA1 to be synchronized with RCLK0 so as to output a delayed positive-edge playback signal RDATA0D and a delayed negative-edge playback signal RDATA1D. The delayed negative-edge playback signal is delayed by −KT to +LT, where K and L are integers and T is the clock period. The signal combining circuit combines the delayed positive-edge and negative-edge playback signals, and outputs (K+L+1) combined signals. The signal selecting circuit detects marks contained in the playback signal, the marks being independent of the (K+L+1) combined signals, and outputs selected ones of the combined signals based on the detected marks.

35 Claims, 13 Drawing Sheets

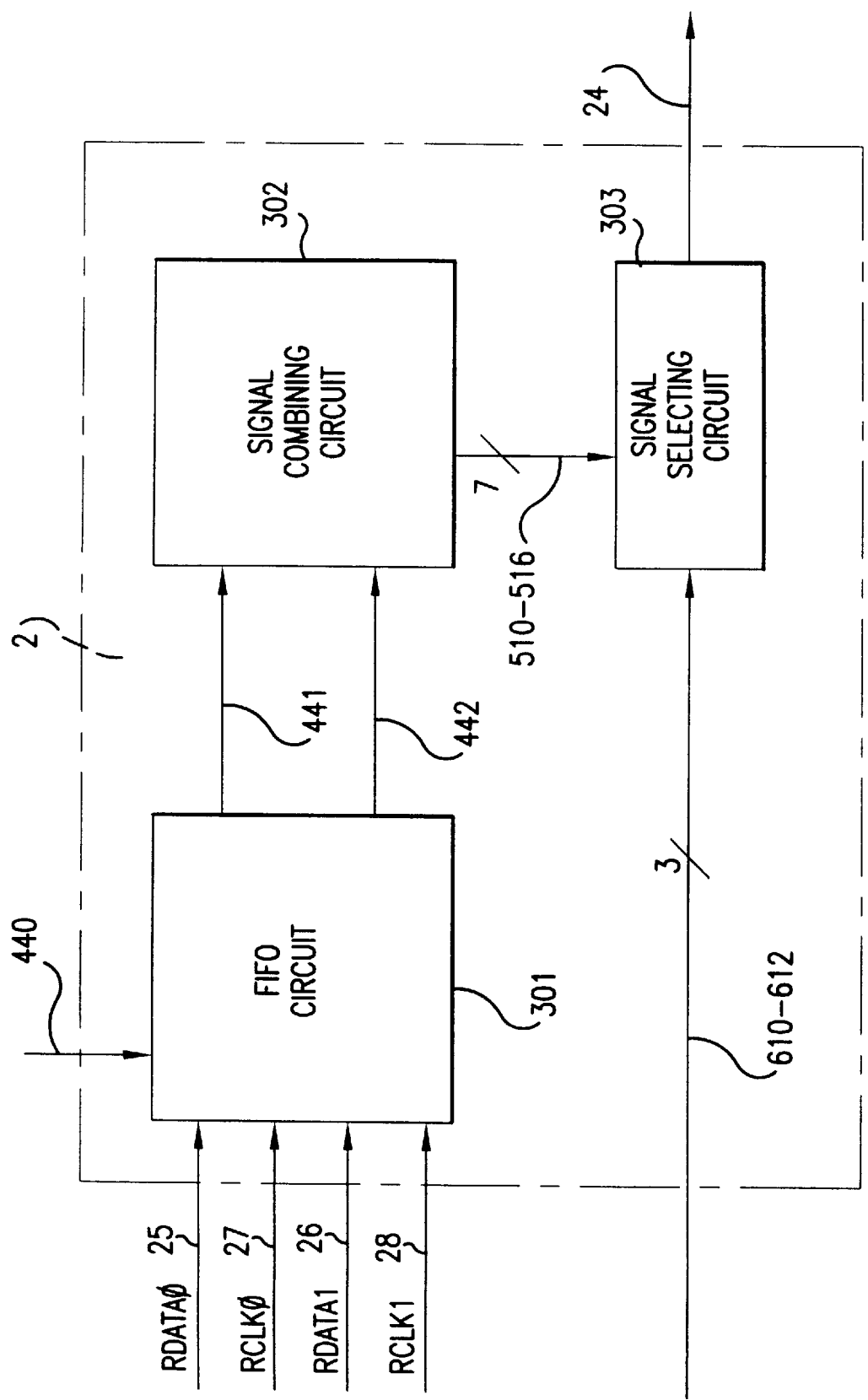

INFORMATION PLAYBACK APPARATUS

CROSS REFERENCE TO RELATED APPLICATIONS

This Non-Provisional Application claims the benefit of U.S. Provisional Application No. 60/015,654, filed Apr. 19, 1996.

This Application also is related to U.S. Non-Provisional Patent Application No. (Attorney Docket No. JAO 32304), entitled "Clock Combining Circuit," filed concurrently herewith.

BACKGROUND OF THE INVENTION

1. Field of the Invention

The present invention relates to an information playback apparatus such as, for example, an optical disk apparatus that accomplishes playback of user data from an optical disk.

2. Description of Related Art

Edge recording methods that record data on a recording medium by corresponding is in a data stream to the positions of the positive edges and negative edges of a recording signal, and that accomplish data decoding by detecting the positive edges and negative edges of the playback signal waveform are utilized, for example, by ISO 5.25 inch quadruple density magnetooptical disk drives in order to achieve high density recording. When data is recorded through this kind of edge recording method, the data is recorded by converting the data into 1.7-modulation run length limited code and causing the positive edges and negative edges of the recording signal to correspond to edge positions of a condition change pattern (i.e, a mark) formed on the recording medium by pits or the like. During playback, a clock is created that is synchronized with the positive edge or with the negative edge of the playback signal waveform obtained from the recording medium. The binarized waveform of the playback signal is sampled using this clock and the binarized data indicating a "1" at the positions of positive edges and negative edges in the waveform is played back. Furthermore, data is played back by conducting data decoding after obtaining the byte synchronization from mark detection such as SYNC or the like.

However, when data recording is accomplished through edge recording methods, there are cases when, for example, the front edges and back edges of the pits do not have the desired spacing. This occurs, for example, due to the effects of fluctuations in the recording conditions and thermal capacity of the recording medium when the pits are provided by irradiating the optical disk with laser light. In other words, this causes the pit length to fluctuate. For example, when a pit is provided after a long blank, the position of the front edge is shifted to a delayed position. Additionally, when a blank is provided after a long pit, the back edge of the pit is shifted to a delayed position. When these kinds of shifts occur, a discrepancy is created in the relative positional relationship of the positive edge and negative edge of the playback signal, i.e., a phase error is created. When a phase error is created, it is difficult to playback accurately the data near the negative edge when data playback is accomplished using a clock that is synchronized with the positive edge. It also is difficult to playback accurately the data near the positive edge when data playback is accomplished using a clock, that is synchronized with the negative edge.

Accordingly, it is necessary to correct for shifts in the front edges and back edges during recording.

SUMMARY OF THE INVENTION

It is an object of the present invention to provide an information playback apparatus that self-corrects the shift amounts from the normal position between edges and has a circuit that supplies playback data having no phase errors to a data decoding circuit, with respect to edge recording methods that use the positive and negative edges as data.

In order to achieve the above and other objects, an information playback apparatus of the present invention includes a signal combining circuit comprising a FIFO circuit, a signal combining circuit and a signal selecting circuit. The FIFO circuit accepts a positive-edge playback signal (RDATA0) that has as data the positive edge of a playback signal obtained from recording domains formed in the recording medium, RDATA0 being synchronized with a positive-edge clock signal (RCLK0). The FIFO circuit also accepts a negative-edge playback signal (RDATA1) that has as data the negative edge of the playback signal, RDATA1 being synchronized with a negative-edge clock signal (RCLK1). The FIFO circuit causes RDATA0 and RDATA1 to be synchronized with RCLK0 so as to output a delayed positive-edge playback signal RDATA0D and a delayed negative-edge playback signal RDATA1D. The delayed negative-edge playback signal is delayed by $-KT$ to $+LT$, where K and L are integers and T is the clock period. The signal combining circuit combines the delayed positive-edge and negative-edge playback signals, and outputs $(K+L+1)$ combined signals. The signal selecting circuit detects marks contained in the playback signal, the marks being independent of the $(K+L+1)$ combined signals, and outputs selected ones of the combined signals based on the detected marks. The output signal is supplied to a data decoding circuit for further processing.

In one embodiment, the FIFO circuit can include an $(N+1)$ bit first register (N being an arbitrary integer) that causes RDATA0 to be delayed in synchronism with RCLK0. The FIFO circuit can also include $(M+N)$ memory units (M being an arbitrary integer), each having a write pointer and a read pointer. The $(M+N)$ memory units store RDATA1 in synchronism with RCLK1 when the write pointer for the memory unit is ON, and output the stored RDATA1 in synchronism with RCLK0 when the read pointer for the memory unit is ON. The FIFO circuit also includes first and second ring counters that have $(M+N)$ flip-flops connected in a ring shape. In the first ring counter, the Ith (I being an integer such that $0 \leq I < (M+N)$) flip-flop is set to ON and the remaining flip-flops are set to OFF when the reset signal is ON. Additionally, the first ring counter shifts the flip-flop that is ON in synchronism with RCLK1 when the reset signal is OFF. The outputs of each flip-flop are connected as the write pointers in a one-to-one correspondence with the $(M+N)$ memory units. In the second ring counter, the Jth (J being the remainder of $(I+N)/(M+N)$) flip-flop is set to ON and the remaining flip-flops are set to OFF when the reset signal is ON. Additionally, the second ring counter shifts the flip-flop that is ON in synchronism with RCLK1 when the reset signal is OFF. The outputs of each flip-flop are connected as the read pointers in a one-to-one correspondence with the $(M+N)$ memory units.

The values K, L, M and N can be such that $N \leq L$ and $M \leq K$.

In addition, the reset signal can be input into the first and second ring counters from a source that is outside of the clock combining circuit.

The information playback apparatus can further comprise a ring counter reset circuit that monitors which of the flip-flops in the first ring counter are ON and that monitors which of the flip-flops in the second ring counter are ON. The ring counter reset circuit then sets an internal reset signal to ON when the flip-flops that are set ON in the first and second ring counters have a specific positional relationship. The ring counter reset circuit outputs to the first and second ring counters the OR output of the internal reset signal and the reset signal input from outside of the clock combining circuit.

The signal combining circuit can comprise: a (K+1) bit second shift register that further delays RDATA0D in synchronism with RCLK0; a (K+L+1) bit third register that further delays RDATA1D in synchronism with RCLK0; and (K+L+1) OR gates that combine the output of the second shift register and each of the (K+L+1) bits of the third shift register.

The signal selecting circuit can comprise: (K+L+1) mark detection circuits that detect specific mark patterns contained in the playback signal, the mark patterns being independent of each of the (K+L+1) combined signals, and that output mark detection signals when the specific mark pattern is detected; and a multiplexer that outputs selected ones of the combined signals based on the mark detection signals output from the mark detection circuits.

The mark detection circuits can perform a mark detection only when a detection window signal supplied to each mark detection circuit is ON. In addition, the mark detection circuits can perform a mark detection when any of a plurality of detection window signals is ON, the detected mark pattern being changed by changing the detection window signals that are ON. Specific ones of the mark detection circuits can be turned OFF based on the detection window signals that are ON.

The signals supplied to the clock combining circuit can be different from what was described above. For example, the manner in which RDATA0 and RCLK0 are used can be switched with RDATA1 and RCLK1, and vice versa. In such an example: the negative-edge playback signal can be used as RDATA0; the negative-edge clock signal can be used as RCLK0; the positive-edge playback signal can be used as RDATA1; and the positive-edge clock signal can be used as RCLK1.

The recording medium may be a magnetooptical disk, or an overwriteable magnetooptical disk, for example.

BRIEF DESCRIPTION OF THE DRAWINGS

The invention will be described in conjunction with the following drawings in which like reference numerals designate like elements and wherein:

FIG. 3 is a block diagram of the clock combining circuit of an embodiment of the present invention;

DETAILED DESCRIPTION OF PREFERRED EMBODIMENTS

Figure 1:
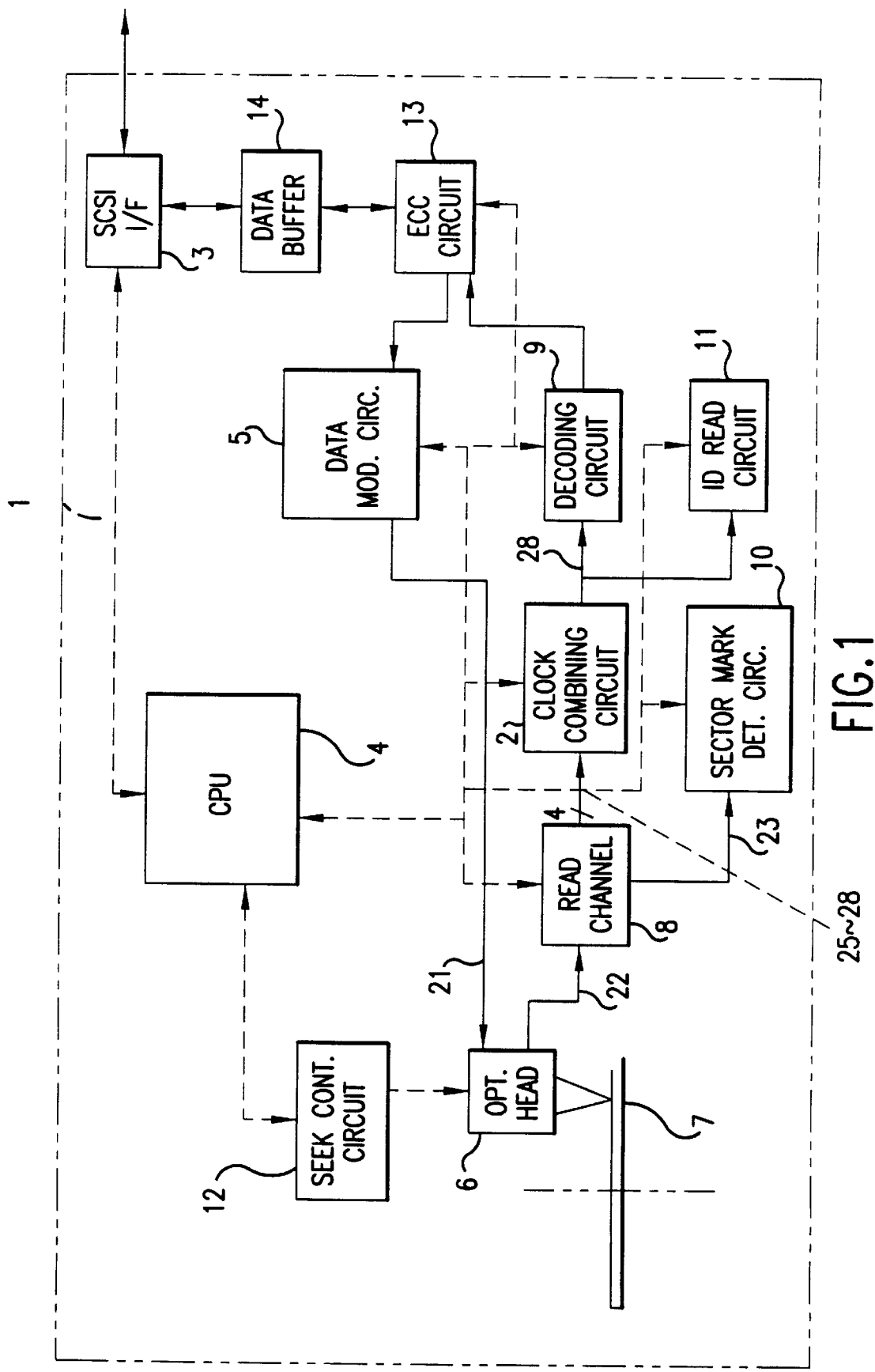
FIG. 1 is a block diagram of a magnetooptical disk apparatus of an embodiment of the present invention.

FIG. 1 is a block diagram of a magnetooptical disk apparatus according to a first embodiment of the present invention. The apparatus includes a clock combining circuit 2, a SCSI I/F circuit 3, a CPU 4, a data modulating circuit 5, an optical head 6, a magnetooptical disk 7, a read channel 8, a data decoding circuit 9, a sector mark detecting circuit 10, an ID read circuit 11, a seek control circuit 12, an ECC circuit 13, and a data buffer 14. In FIG. 1, the solid lines represent signal lines, whereas the dashed lines represent control lines.

The magnetooptical disk 7 is formatted as the ISO 5.25 inch quadruple density 1K format on the disk surface. Thus, the magnetooptical disk 7 is such that the disk surface is partitioned into 34 bands (bands 0 through 33), each band having 765 spiral-shaped tracks. The tracks are composed of from 66 (band 0) to 33 (band 33) sectors, and data recording and playback are accomplished in units of sectors. The sectors have the format shown in FIG. 2.

Figure 2:
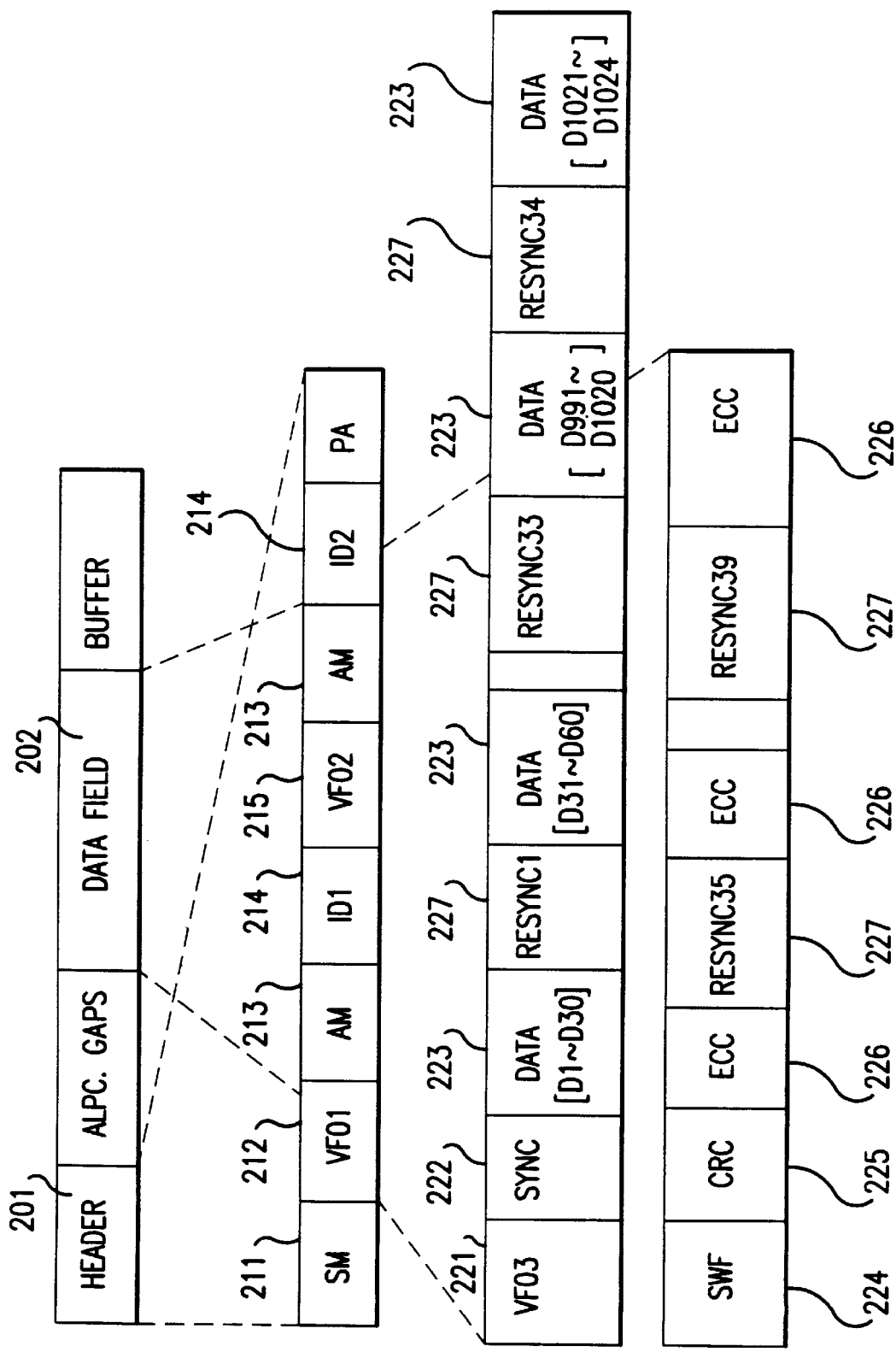
FIG. 2 is a sector format diagram of the magnetooptical disk of an embodiment of the present invention.

As shown in FIG. 2, the format includes, inter alia, a header 201 and a data field 202. The header 201 includes: a sector mark 211 indicating the top position of the sector; a VFO1 212 and a VFO2 215, which are areas used to extract the clock that has been synchronized with the playback signal for ID playback; address marks 213, which are used to obtain the byte synchronization of the ID; and IDs 214 on which the address information of the sector is recorded.

The data field 202 includes: a VFO3 221, which is an area used to extract the clock that has been synchronized with the playback signal for data playback; SYNC 222, which is used to obtain the byte synchronization of the data; data 223; an SWF 224, which is an area used to write a write history onto WORM-type disks; a CRC symbol 225, which is used to accomplish detection and correction of data errors; and ECC symbols 226. The data 223, the SWF 224, the CRC 225 and the ECC 226 are partitioned into 40 segments in 30 byte units, and RESYNC 7, which is a mark used to reaccomplish byte synchronization, is inserted between the segments.

When a data write command is sent to the CPU 4 from an unrepresented host computer through the SCSI T/F circuit 3, the CPU 4 sends a seek command to the seek control circuit 12. The seek control circuit 12 causes the optical head 6 to move to the track where the target sector exists.

The optical head 6 obtains the playback signal 22 of this sector by irradiating this sector with a laser. The read channel 8 accepts this playback signal 22 and outputs the sector mark playback data 23. The sector mark detecting circuit 10 detects the sector mark 211 from the sector mark playback data 23. In addition to this, the read channel 8 and the clock combining circuit 2 create playback data 24 from the playback signal 22. The ID read circuit 11 reads the ID 214 from the playback data 24 of the header 201, using the sector mark detection as a trigger, and compares this with the address of the target sector. The target sector is accessed by this sector mark detection and ID reading is repeated until the ID that has been read matches the address of the target sector.

The data 223 that is to be recorded in the target sector is sent to the data buffer 14 by the host computer beforehand via the SCSI I/F circuit 3. The SWF 224, the CRC symbol 225 and the ECC symbol 226 are attached in the ECC circuit 13, and after the series of modulation processes consisting of: (1) (1,7) RLL modulation; (2) insertion of the VFO3 221, the SYNC 222 and the RESYNC 227; and (3) conversion of the recording signal 21 corresponding to the edge recording method, has been accomplished by the data modulation circuit 5, the optical head 6 forms the pit corresponding to the recording signal 21 on the target sector.

On the other hand, when a data read command is sent to the CPU 4 from the host computer via the SCSI I/F circuit 3, the CPU 4 accesses the target sector using the same method as during data writing.

After the target sector has been accessed, the data decoding circuit 9 performs a series of decoding processes consisting of establishing byte synchronicity for the playback data 24 of the data field 202 of the target sector through detecting the SYNC 222 and the RESYNC 227, and (1,7) RLL demodulation. After error correction has been accomplished by the ECC circuit 13, the data 223 is played back. The data 223 is sent to the host computer via the data buffer 14 and the SCSI I/F circuit 3.

The read channel 8 binarizes the playback signal input from the optical head 6. The binarized data is output as the sector mark playback data 23. The read channel 8 also extracts from the binarized data the clock RCLK0 27, which is synchronized with the positive-edge of the binarized data, and the clock RCLK1 28, which is synchronized with the negative-edge. This clock extraction process is accomplished using VFO1 212, VFO2 215 and VFO3 221 on which a continuous pattern of 2T has been recorded (where T is the clock period). The read channel 8 also samples the binarized data using the RCLK0 27, and detects the positive edges therein. The positive-edge playback data RDATA0 25 is created, which indicates a 1 only at the positive-edge positions. The read channel 8 also samples the binarized data using the RCLK1 28, and detects the negative edges therein. The negative-edge playback data RDATA1 26 is created, which indicates a 1 only at the negative-edge positions.

RDATA0 25, RDATA1 26, RCLK0 27 and RCLK1 28 are output to the clock combining circuit 2. The clock combining circuit 2 automatically corrects the shift amount from the normal position between RDATA0 25 and RDATA1 26 by using RDATA0 25, RDATA1 26, RCLK0 27, and RCLK1 28, and combines both data. The combined data is output as the playback data 24. The actions of the clock combining circuit 2 will be described in detail with reference to the preferred embodiment.

FIG. 3 is a block diagram of clock combining circuit 2 according to a first embodiment of the present invention. The clock combining circuit 2 includes a FIFO circuit 301, a signal combining circuit 302 and a signal selecting circuit 303.

Figure 4A:
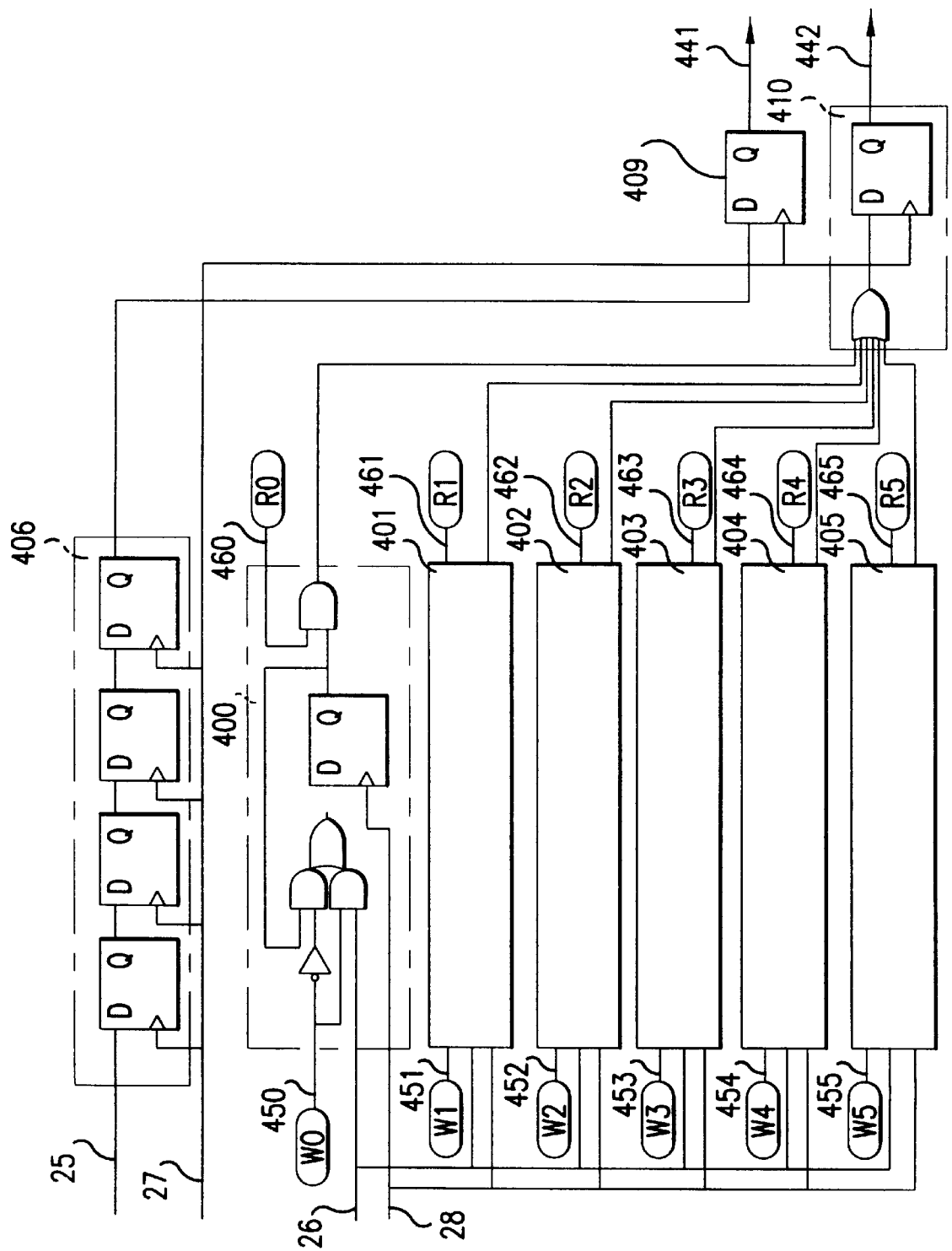
FIGS. 4A and 4B are a block diagram of the FIFO circuit of a first embodiment of the present invention.
Figure 4B:
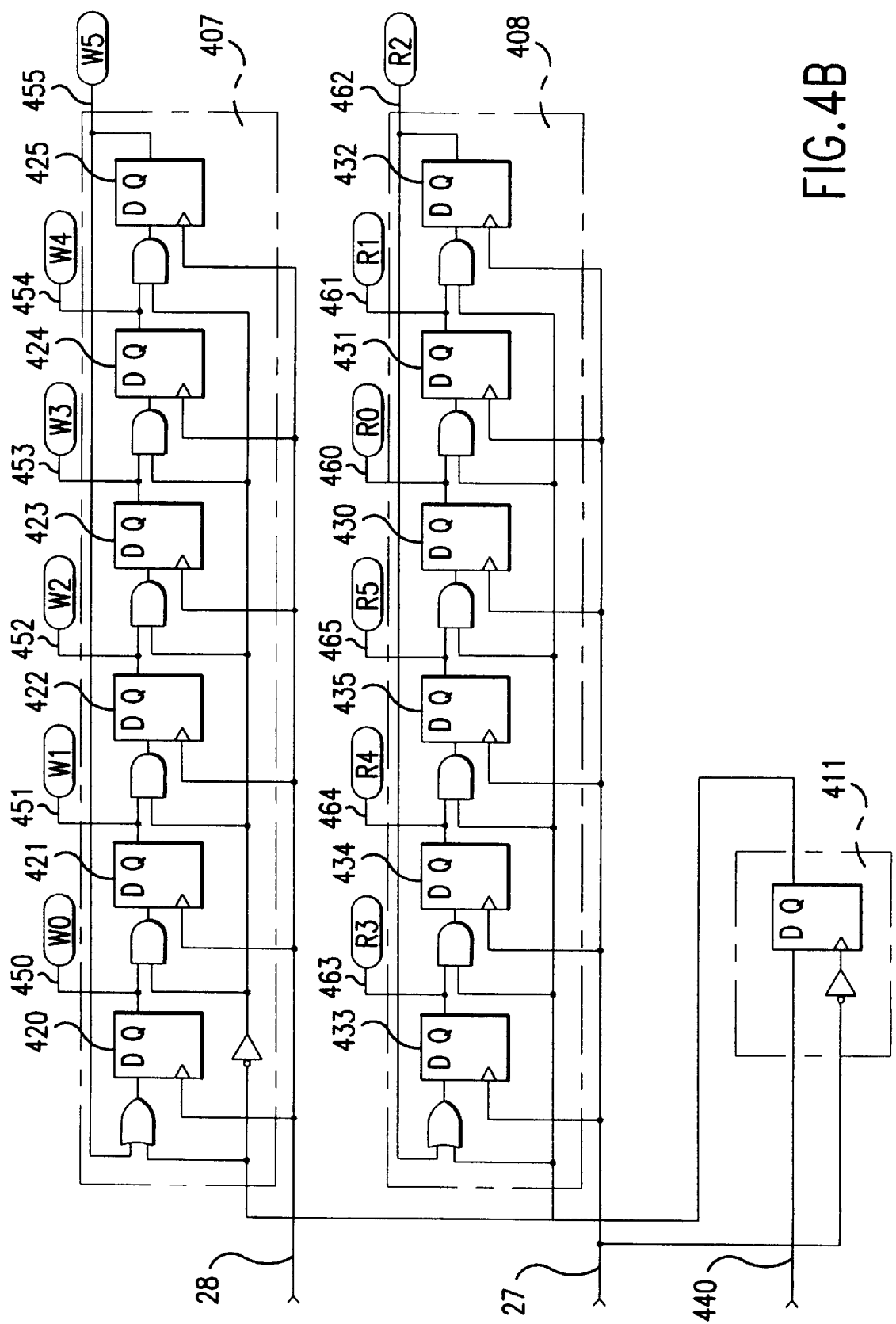

FIGS. 4A–B are a block diagram of the FIFO circuit 301 of the first embodiment. FIFO circuit 301 comprises a first shift register 406, six memories 0–5 (400–405), a first ring counter 407, a second ring counter 408, a first output buffer 409, a second output buffer 410 and a first input buffer 411.

The first shift register 406 is a four-bit shift register that causes the positive-edge playback signal RDATA0 25 to be delayed by 4T (where T is the clock period) in synchronism with the positive-edge clock signal RCLK0 27.

Each memory 400–405 accepts the negative-edge playback signal RDATA1 26 in synchronism with the negative-edge clock signal RCLK1 28 when its respective write pointer W0–W5 (450–455) has a value of 1, and outputs the data in synchronism with the stored RCLK0 27 when its respective read pointer R0–R5 (460–465) has a value of 1.

The first ring counter 407 includes six flip-flops 420–425 that are connected in a ring shape. The outputs of flip-flops 420–425 are the respective write pointers W0–W5 450–455. The flip-flop 420 is set to 1 and the remaining flip-flops are set to 0 when the reset signal 440 is 1. The contents of the flip-flops 420–425 are shifted in synchronism with RCLK1 28 when the reset signal is 0. Accordingly, any flip-flop that has been set to 1 is shifted in synchronism with RCLK1 28 when the reset signal 440 is 0.

The second ring counter 408 comprises six flip-flops 430–435 that are connected in a ring shape. The outputs of flip-flops 430–435 are the respective read pointers R0–R5 460–465. The flip-flop 433 is set to 1 and the remaining flip-flops are set to 0 when the reset signal 440 is 1. The flip-flops 430–435 of the second ring counter are shifted in synchronism with RCLK0 27 when the reset signal is 0. Accordingly, any flip-flop that has been set to 1 is shifted in synchronism with RCLK0 27 when the reset signal 440 is 0.

The first output buffer 409 delays by 1T the output of the first shift register 406, and outputs this value as RDATA0D 441, also referred to herein as the delayed positive-edge playback signal.

The second output buffer 410 takes the OR output of the memories 400–405 and, after delaying by 1T, outputs this value as RDATA1D 442, also referred to herein as the delayed negative-edge playback signal.

The reset signal 440 is output from the data decoding circuit 9 or the like of FIG. 1, and is accepted by the first input buffer 411. The reset signal becomes 0 in the VFO1 212 of the accessed sector, and becomes 1 after ID reading is complete. The reset signal also becomes 0 in the VFO3 221 of the read target sector, and becomes 1 after data reading is complete.

Figure 5:
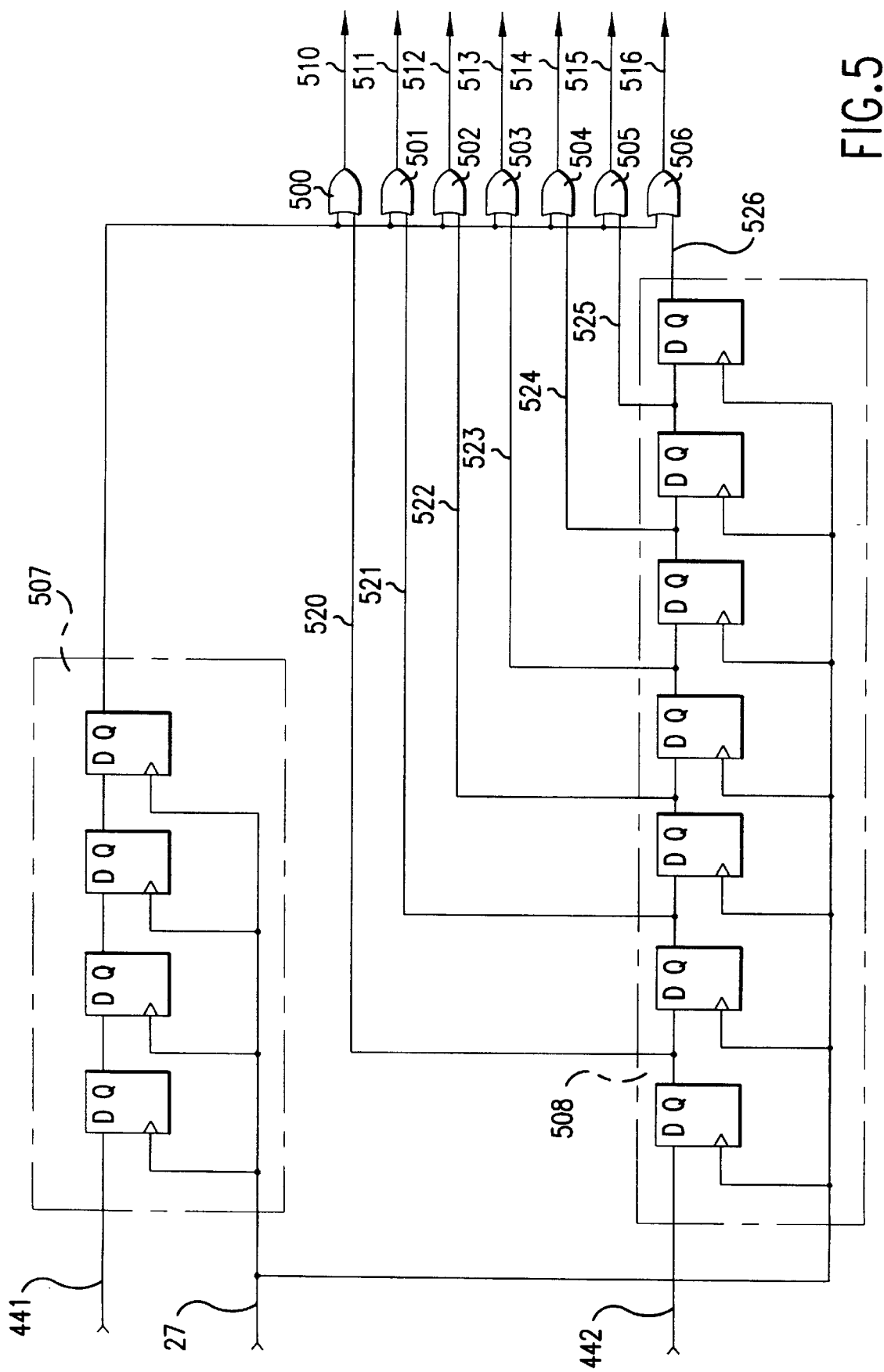
FIG. 5 is a block diagram of the signal combining circuit of an embodiment of the present invention.

FIG. 5 is a block diagram of the signal combining circuit 302 of the first embodiment of the present invention. The signal combining circuit 302 includes a second shift register 507, a third shift register 508 and OR gates 0 to 6 (500 to 506). The second shift register 507 is a four-bit shift register that causes the delayed positive-edge playback signal RDATA0D 441 to be delayed by 4T in synchronism with RCLK0 27. The third shift register 508 is a seven-bit shift register that causes the delayed negative-edge playback signal RDATA1D 442 to be delayed by 7T in synchronism with RCLK0 27. The delay data 0 to 6 (520 to 526) output from each of the registers in the third shift register 508 are output to the OR gates 500 to 506.

Each OR gate 500+n (n=0–6) finds the logical OR of the output of the final bit register of the second shift register 507 and its respective delay data 520+n, and outputs the result as the combined data 510–516 (i.e., 510+n (n=0–6)).

Figure 6:
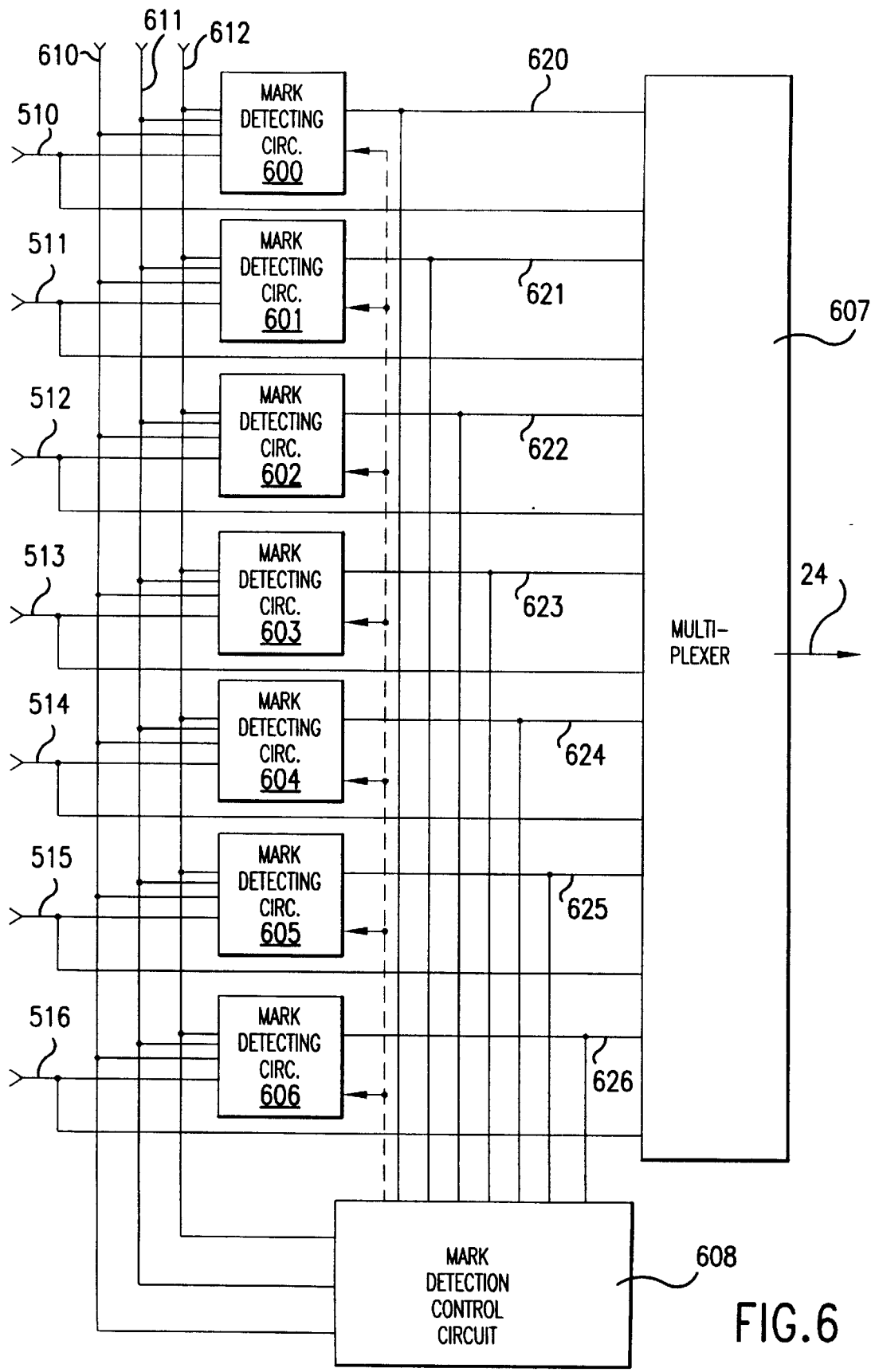
FIG. 6 is a block diagram of the signal selecting circuit of an embodiment of the present invention.

FIG. 6 is a block diagram of the signal selecting circuit 303 of the first embodiment of the present invention. The signal selecting circuit 303 includes seven mark detecting circuits 0 to 6 (600 to 606), a multiplexer 607 and a mark detection control circuit 608.

Each mark detecting circuit 600–606 detects a specific mark pattern from the combined data 510–516, respectively. When a detection window signal 0 (610) is 1, the mark detecting circuits 600–606 detect whether a 2T repeating pattern is contained in VFO1 (212). When one of the circuits 600–606 detects the 2T repeating pattern, the detection signal (i.e., the output 620–626) for that circuit 600–606 is set to 1. When detection window signal 1 (611) is 1, the mark detecting circuits 600–606 detect whether a 2T repeating pattern is contained in VFO3 (221). When one of the circuits 600–606 detects the 2T repeating pattern, the output 620–626 for that circuit is set to 1. When detection window signal 2 (612) is 1, the mark detecting circuits 600–606 detect whether the RESYNC 227 is present. When one of the circuits 600–606 detects the RESYNC 227, the output 620–626 for that circuit is set to 1. The multiplexer 607 outputs the combined signal 510+n (n=0–6) as playback data 24 when the detection signal 620+n (n=0–6) associated with that combined signal is 1. (For example, combined signal 512 is output as the playback data 24 when detection signal 622 is 1.)

When one of the detection signals 620–626 of one of the mark detecting circuits 600–606 becomes 1, the mark detection control circuit 608 resets the detection signals (i.e., the outputs) of the other mark detecting circuits to 0.

The mark detection control circuit 608 also turns the detection function of mark detecting circuit 0 (600), mark detecting circuit 5 (605) and mark detecting circuit 6 (606) to OFF when detection window signal 0 (610) or detection window signal 1 (611) is 1.

The actions of the clock combining circuit 2 of the first embodiment of the present invention will be explained in further detail using a timing chart.

Figure 8:
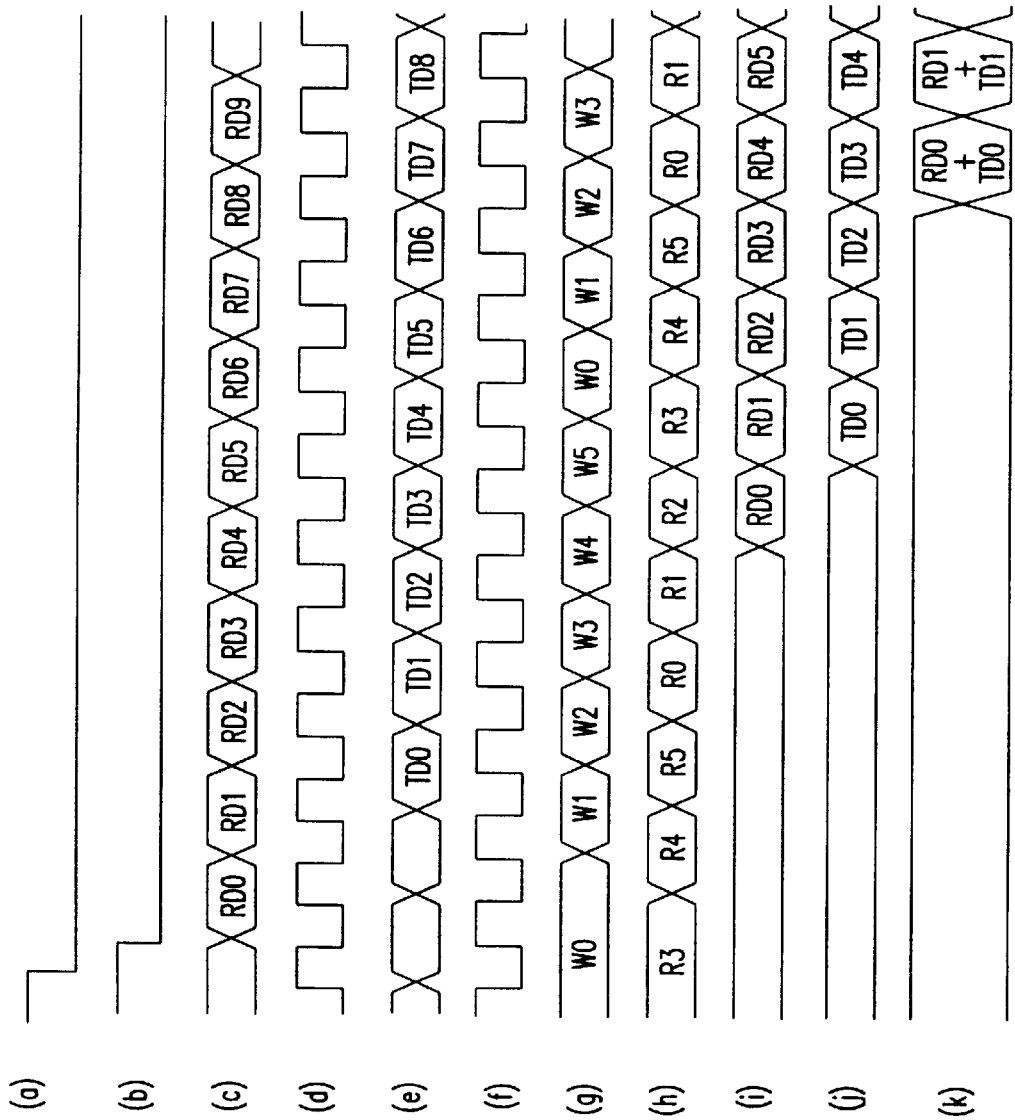
FIG. 8 is a timing chart explaining how the first embodiment of the present invention corrects phase error in a playback signal.

FIG. 8 is a timing chart showing the actions of the clock combining circuit 2 correcting the shift amount (phase error) from the normal position between the two edges using VFO3 221 as the detection window signal (i.e., detection window signal 611 is set to 1, while detection window signals 610 and 612 are set to 0). In FIG. 8, RDATA1 (e) is delayed by 1.5T phase relative to RDATA0 (c). That is, there is a 1.5T phase error. (Hereafter, phase error is defined to be the delay in phase of RDATA1 relative to RDATA0; this will be abbreviated Pe.)

The reset output (b) from the first input buffer 411 becomes 0 when the reset signal (a) (440) becomes 0. Using this event as a trigger, the first ring counter 407 and the second ring counter 408 start a condition transition. That is, the condition transition (g) of the write pointer is set to 1 in the sequence W0→W1→W2→W3→W4→W5→W0→ . . . , in synchronism with RCLK1 (f) The condition transition (h) of the read pointer is set to 1 in the sequence R3→R4→R5→R0→R1→R2→R3→ . . . , in synchronism with RCLK0 (d). (In other words, prior to the reset signal (a) becoming 0, write pointer W0 and read pointer R3 were set to 1, while the other pointers were set to 0. Once the reset signal (a) becomes 0, the 1 set in W0 and R3 is transferred in the above-mentioned sequences through the other pointers in synchronism with their respective clock signals.)

Through this process, because write pointer m becomes 1 and then 2.5T later read pointer 400+m becomes 1, the data of RDATA1 (e) is stored in memory m (m=0 to 5), and 2.5T later, this data is output. In addition, RDATA0 (c) is delayed by 3T by the first shift register 406. RDATA0D output by the first output buffer 409 is the signal shown in (i), and RDATA1D output by the second output buffer 410 is the signal shown in (j). The phase error of the two signals is 1T.

Basically, FIFO circuit 301 quantizes the phase errors (that is, the phase error becomes equal to αT when (α−0.5)T<Pe≦(α+0.5)T, where α is an integer). That is, this circuit has the function of making it so that a digital phase correction is performed by the signal combining circuit 302.

The signal combining circuit 302 combines RDATA0D (i) and the signal that is RDATA1D (j), which has been delayed by −3 to +3T, and outputs the result as combined data 0 to 6 (510 to 516).

The signal selecting circuit 303 is used to select which of the combined data 0 to 6 (510–516) is correct (i.e., which one has the phase error corrected).

In FIG. 8, a phase correction is accomplished by VFO3 221, and consequently, detection window signal 1 (611) becomes 1. Mark detection circuits 1 to 4 (601 to 604) achieve a detection action ON state, and a 2T repeating pattern is detected from combined data 1 to 4 (511 to 514).

Because RDATA0D (i) and RDATA1D (j) create a phase error of 1T, the combined data 2 (512), which is the combination of RDATA0D (i) and data that is RDATA1D (j) delayed by −1T, is data in which the phase error has been corrected. Mark detection circuit 2 (602), which performs pattern detection on this combined data 2 (512), achieves a mark detection OK state, and detection signal 2 (622) to the multiplexer 607 becomes 1. The other mark detection circuits are in either a detection NG or a detection action OFF state, and consequently, detection signals 0, 1, 3, 4 and 5 (620, 621, 623, 624 and 625) become 0. Hence, the multiplexer outputs the combined data 2 (512) as the playback data (k). In this way, the clock combining circuit 2 of the first embodiment of the present invention has the functions of correcting the phase error and creating correct playback data (k).

The phase correction by VFO3 221 shown in FIG. 8 is effective for detecting the succeeding SYNC 222 and reading the data 223. With the first embodiment of the present invention, phase errors in the range of −1.5T<Pe≦2.5T can be corrected.

With the first embodiment of the present invention, the detection action of mark detection circuits 0, 5 and 6 (600, 605 and 606) is OFF. This is now explained. When phase correction is performed on the 2T repeating pattern of VFO3 221 as a reference pattern, combined data 0 (510) and combined data 4 (514), combined data 1 (511) and combined data 5 (515), and combined data 2 (512) and combined data 6 (516) become the same data because of the periodicity of the pattern. In this case, if the detection action of all mark detecting circuits 0 to 6 (600–606) is turned ON and signal selection is conducted, when the detection signals of two mark detecting circuits can become 1 simultaneously, the multiplexer 607 cannot perform signal selection. With the first embodiment of the present invention, because the large phase error rarely occurs, mark detecting circuits 0, 5 and 6 (600, 605 and 606), which are used to correct large phase errors are set to detection action OFF states.

With the example shown in FIG. 8, the case where phase correction was accomplished by VFO3 221 was described. The first embodiment of the present invention can, however, realize phase correction with VFO1 212 or with RESYNC 227. The phase correction by VFO1 212 is effective for detecting the succeeding address 213 and reading the ID 214, and with the first embodiment of the present invention, phase errors can be corrected in the range of −1.5T<Pe≦2.5T. The phase correction that uses RESYNC 227 as a reference pattern is effective when reconducting the phase correction in segment units. With the first embodiment of the present invention, phase errors can be corrected in the range of −3.5T<Pe≦3.5T.

The first embodiment of the present invention can also realize phase correction on areas other than those described above as long as these areas satisfy the conditions that: 1) the area has a specific pattern; and 2) extraction of RCLK0 27 and RCLK1 28 is accomplished by the read channel 8 beforehand. For example, it is also possible to accomplish phase correction in which the SYNC 222 is used as a reference pattern in reading the data 223. In this case, because the SYNC 222 does not have periodicity, with the first embodiment of the present invention, phase errors can be corrected in the range of $-3.5T<Pe\leq3.5T$. For example, it is also possible to accomplish phase correction in which the address mark 213 is used as a reference pattern in reading the ID 214. In this case, because the address mark 213 does not have periodicity, with the first embodiment of the present invention, phase errors can be corrected in the range of $-3.5T<Pe\leq3.5T$.

In addition, with the first embodiment of the present invention, the design coefficients K and L of the phase combining circuit 302 and the signal selecting circuit 303 are realized as K=L=3 (K and L being integers that relate to the size of the second and third shift registers 507 and 508 (register 507 is a K+1 bit shift register and register 508 is a K+L+1 bit shift register)). However, the clock combining circuit 2 of the present invention can enhance the phase error correction capabilities by making K and L larger. That is to say, when K=k and L=l, phase errors can be corrected in the range $-(l+0.5)T<Pe\leq(k+0.5)T$.

The first embodiment of the present invention also has a function that checks fluctuations in the phase error after the phase error has been corrected by the phase correction function. This function is produced by the FIFO circuit 301.

Figure 9:
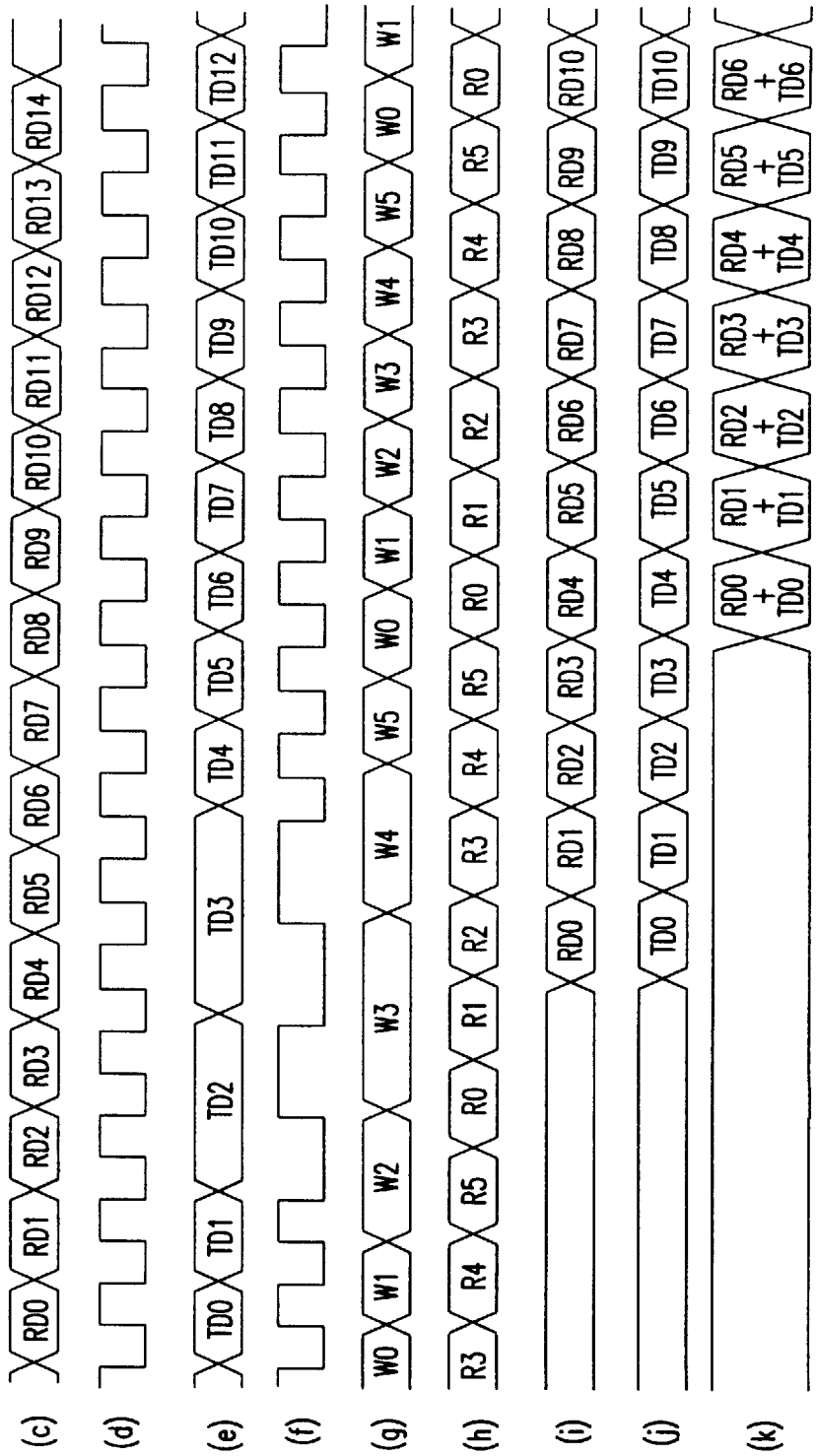
FIG. 9 is a timing chart explaining how the first embodiment of the present invention functions to check phase error fluctuations after correction thereof.

This function will be described using the timing chart in FIG. 9. The signals in (c) to (k) of FIG. 9 are the same as the signals in (c) to (k) of FIG. 8. In addition, in FIG. 9, the phase error at the initial state (when phase correction is executed) is taken to be 0. In FIG. 9, memory m (m=0 to 5) (400–405) in the initial state verifies that write pointer 450+m is 1 and stores data, and 3T later, verifies that read pointer 460+m is 1 and outputs the data. Following this, memory 400+m verifies that write pointer 450+m is 1, and 0.5T later, verifies that read pointer 460+m is 1 because the phase error fluctuates from 0T to +2.5T. Because the timing of storing data does not out pace the timing of outputting data even after the phase error fluctuation, errors are not created in the playback data (k). That is to say, the 2.5T fluctuation in phase error is checked.

With the first embodiment of the present invention, phase error fluctuations (the amount of fluctuation in the phase errors from the initial state; abbreviated Pet) can be checked in the range of $-(3+\beta)T<Pet\leq(3-\beta)T$. However, in the initial state, the phase error is $Pe=(\alpha+\beta)T$, where $\alpha$ is an integer and $\beta$ is a decimal such that $-0.5<\beta\leq0.5$.

In addition, with the first embodiment of the present invention, the design constants M and N of the FIFO circuit 301 are realized as M=N=3. (That is, the first shift register 406 is an N+1 bit register, and there are M+N memories 400–405.) However, the clock combining circuit 2 of the present invention can enhance the phase error fluctuation checking capability by making M and N larger. That is to say, when M=m and N=n, the phase error fluctuation can be checked in the range of $-(n+\beta)T<Pet\leq(m-\beta)T$.

There are times when the clock is increased or decreased by several bits during playback of the data and ID due to the effects of defects on the recording medium. This is called a bit slip. When a bit slip occurs, RCLK0 27 and RCLK1 28 also slip by the same number of bits, and there are times when one or the other of the clocks slips by more (or less) than this. The magnetooptical disk apparatus 1 of the first embodiment of the present invention is such that even when the same amount of bit slip occurs in RCLK0 27 and RCLK1 28 in an arbitrary segment of the data field 202, byte synchronization is reaccomplished at the next RESYNC detection time, and through this it is possible to restart data playback in the segment after this RESYNC.

However, when either RCLK0 27 or RCLK1 28 slips by more or less, after phase correction has been accomplished by the RESYNC 227 in the clock combining circuit 2, it is necessary to reaccomplish byte synchronization through the same RESYNC. When a phase error that cannot be corrected by the clock combining circuit 2 is created through a bit slip, with the first embodiment playback of the data after the bit slip occurs is impossible. This is because the playback data 24 that has been corrected properly cannot be supplied to the data decoding circuit 9, and it becomes impossible to reaccomplish byte synchronization.

Figure 10:
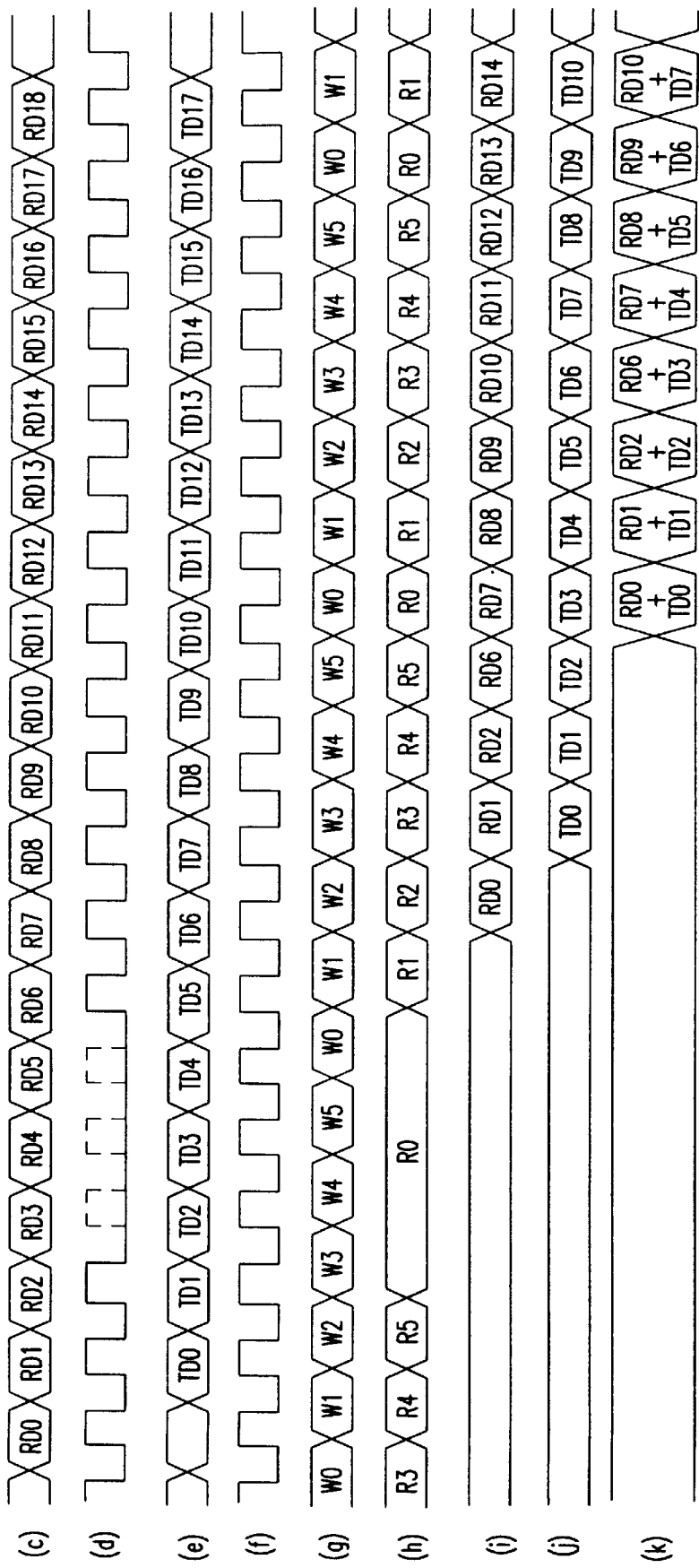
FIG. 10 is a timing chart explaining limitations of the first embodiment of the present invention.

The timing chart in FIG. 10 is a concrete example of this problem. The signals in (c) to (k) of FIG. 10 are the same as the signals in (c) to (k) of FIG. 8. In FIG. 10, a 1T phase error occurs at the initial state (when phase correction is executed). Furthermore, RCLK0 (d) decreases by 3 clocks because of a bit slip. Consequently, at the input of the signal combining circuit 302 (between RDATA0D (i) and RDATA1D (j)), a 4T phase error is created. The signal combining circuit 302 and the signal selecting circuit 303 cannot perform the correction amount revising actions when a phase error exceeding ±3T is input, and consequently, playback data (k) that has a 3T phase error is output, with only the previous amount of phase correction having been performed on the 4T phase error.

The above-described problem can be eliminated if the design constants K and L of the phase combining circuit 302 and the signal selecting circuit 303 are realized so that K=L=4 (that is, the number of bits in the second shift register 507 and in the third shift register 508 and the number of mark detecting circuits are increased). However, if the clock combining circuit 2 of a second embodiment of the present invention is used, the above-described problems can be eliminated without increasing the scale of circuitry in the phase combining circuit 302 and the signal selecting circuit 303.

The magnetooptical disk apparatus 1 of the second embodiment of the present invention has the same composition as the first embodiment (FIG. 1). The clock combining circuit 2 of the second embodiment comprises a FIFO circuit 301, a signal combining circuit 302 and a signal selecting circuit 303, the same as in the first embodiment (FIG. 3). The composition of the signal combining circuit 302 and the signal selecting circuit 303 are the same as in the first embodiment (FIGS. 5 and 6).

Figure 7A:
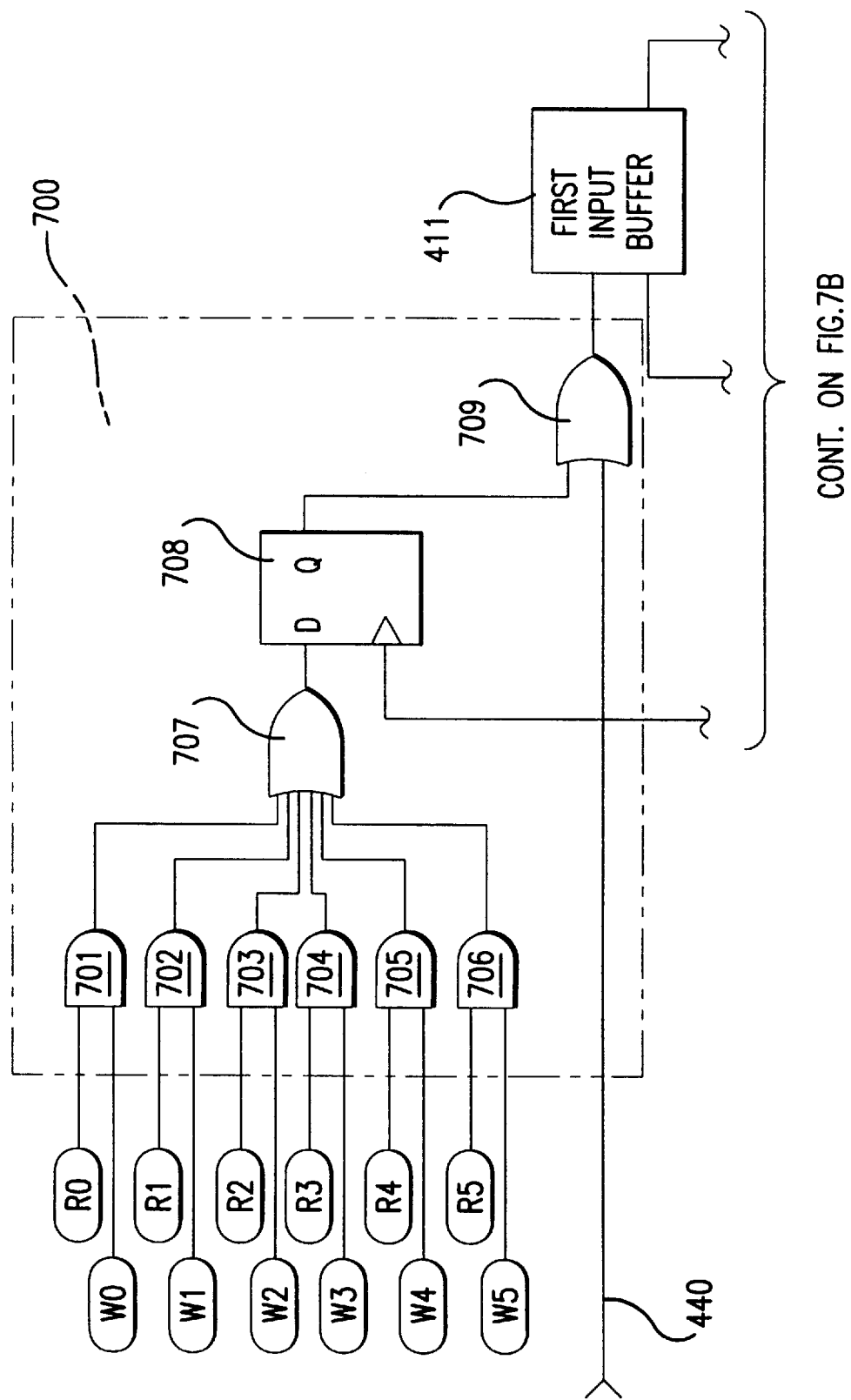
FIG. 7 is a block diagram of the FIFO circuit of a second embodiment of the present invention.
Figure 7B:
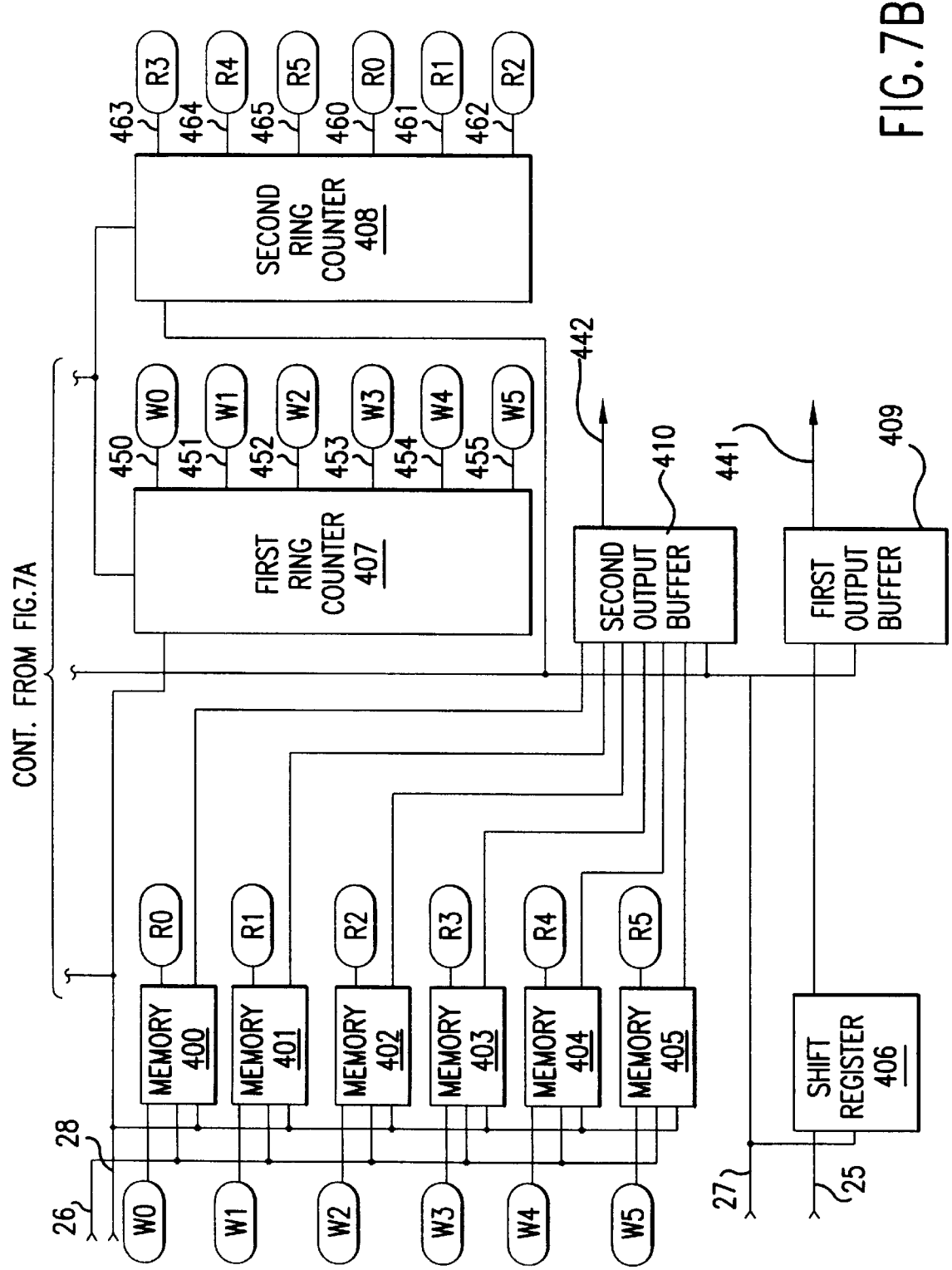

FIG. 7 shows the FIFO circuit 301 of the second embodiment. The FIFO circuit 301 contains memories 0 to 5 (400 to 405), a first shift register 406, a first ring counter 407, a second ring counter 408, a first output buffer 409, a second output buffer 410 and a first input buffer 411. These are the same circuits as in the first embodiment, so description of these circuits is omitted here. Furthermore, similar to the first embodiment, a reference number 25 designates RDATA0, a reference number 26 designates RDATA1, a reference number 27 designates RCLK0, a reference number 28 designates RCLK1, reference numbers 450 to 455 designate write pointers W0 to W5, reference numbers 460 to 465 designate read pointers R0 to R5, a reference number 440 designates a reset signal, a reference number 441 designates RDATA0D and a reference number 442 designates RDATA1D.

The FIFO circuit 301 of the second embodiment has a ring counter reset circuit 700. The ring counter reset circuit 700 comprises AND gates 0 to 5 (701 to 706), a six-input OR gate 707, a flip-flop 708 and a two-input OR gate 709. Write pointers Wm and read pointers Rm are input into AND gates m (m=0 to 5). The outputs of AND gates 701–706 are input into the six-input OR gate 707. The output of the six-input OR gate 707 is sampled by RCLK1 28 in the flip-flop 708, and after this is connected to one terminal of the two-input OR gate 709. The reset signal 440 is input into the other terminal of the two-input OR gate 709. The output of the two-input OR gate 709 is output to the first input buffer 411. In other words, the ring counter reset circuit 700 has the function of monitoring the state of the write pointers and read pointers using RCLK1 28, and resetting the first ring counter 407 and the second ring counter 408 when the write pointer Wm and read pointer Rm become 1 simultaneously.

Figure 11:
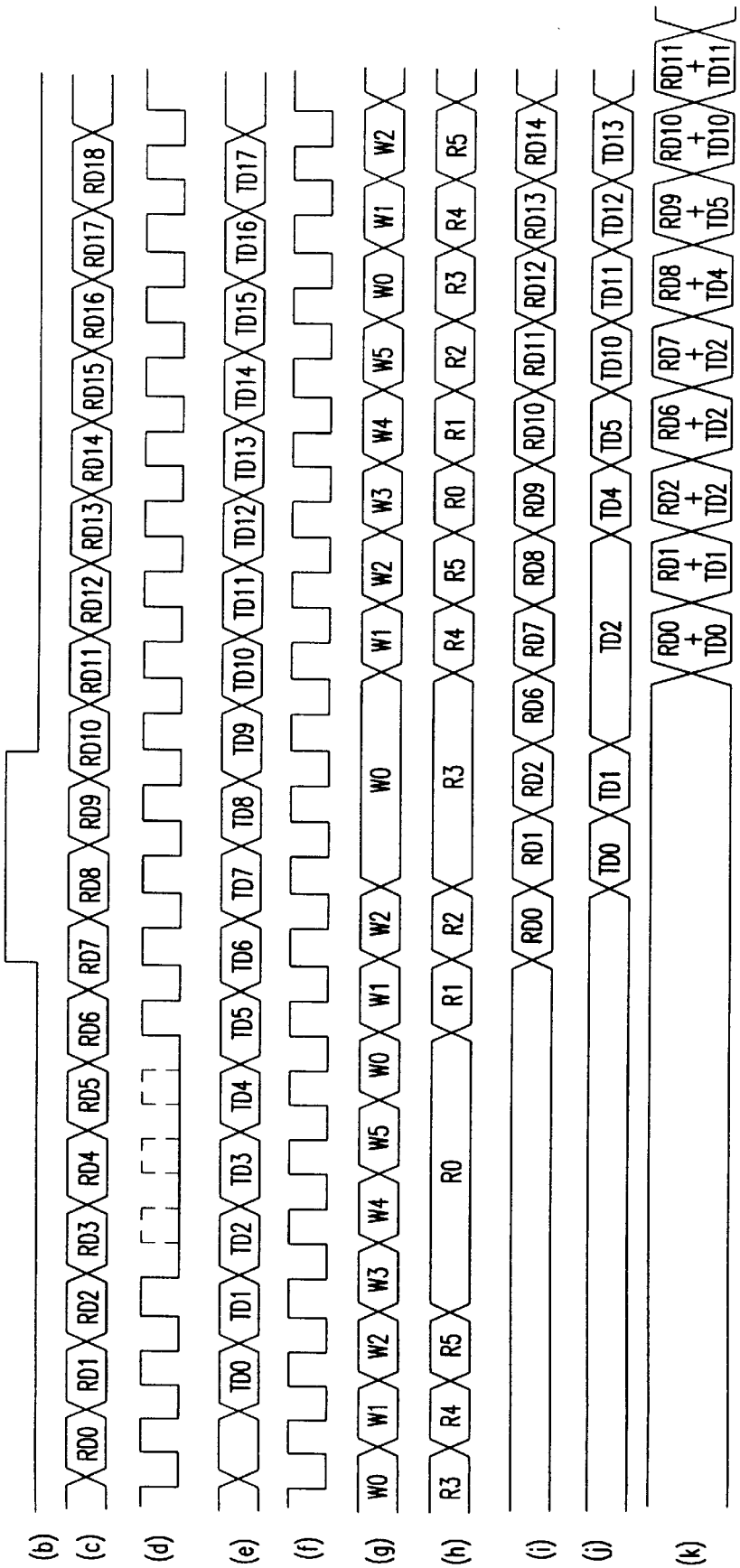
FIG. 11 is a timing chart explaining how the second embodiment of the present invention corrects phase error in a playback signal.

The actions of the second embodiment of the present invention will be described using the timing chart in FIG. 11. The signals in (b) to (k) in FIG. 11 are the same as the signals in (b) to (k) in FIG. 8. In FIG. 11, a 1T phase error is created in the initial state (when phase correction is executed). Furthermore, RCLK0 (d) is decreased by 3 clocks by a bit slip. However, when RCLK0 (d) decreases by 3 clocks, write pointer W0 and read pointer R0 become 1 simultaneously (refer to signals (g) and (h)). The ring counter reset circuit 700 detects the creation of a bit slip through this process, and resets the first ring counter 407 and the second ring counter 408. Furthermore, 11T after the reset has been accomplished, the phase error returns to 1T between the inputs of the signal combining circuit 302 (RDATA0D (i) and RDATA1D (j)), and the correct playback data (k) is output. Through this process, the second embodiment is able to cope with bit slips with which the first embodiment of the present invention could not cope.

With the second embodiment of the present invention, when write pointer Wm and read pointer Rm become 1 simultaneously, that is, when the number of the flip-flop in which the write pointer becomes 1 and the number of the flip-flop in which the read pointer becomes 1 matches, the first ring counter 407 and the second ring counter 408 are reset. However, the capacity to cope with bit slips can be further strengthened if the two ring counters are reset when the difference in the numbers of these flip-flops is within +1T (improvement 1 of the second embodiment) or within +2T (improvement 2 of the second embodiment).

The following chart shows the capacity to cope with bit slips in the first embodiment of the present invention as well as the second embodiment and improvement 1 and improvement 2 thereto. The capacity to cope becomes stronger in the order: first embodiment, second embodiment, improvement 1, and it becomes possible to cope with all bit slips with improvement 2. In the capacities for coping with bit slips in the chart below, the γ in "γ≦coping" is γ=(the bit slip number of RCLK1)−(the bit slip number of RCLK0).

| | Bit slip coping capacity | | | |
|---|---|---|---|---|
| Phase error (initial state) | First Embodiment | Second Embodiment | Improvement 1 to second embodiment | Improvement 2 to second embodiment |
| −3.5 < ≦ −2.5 | 0 ≦ coping | 0 ≦ coping | 0 ≦ coping | cope with all |
| −2.5 < ≦ −1.5 | −1 ≦ coping | −1 ≦ coping | cope with all | cope with all |
| −1.5 < ≦ −0.5 | cope with all | cope with all | cope with all | cope with all |
| −0.5 < ≦ 0.5 | cope with all | cope with all | cope with all | cope with all |
| 0.5 < ≦ 1.5 | 2 ≦ coping | cope with all | cope with all | cope with all |
| 1.5 < ≦ 2.5 | 1 ≦ coping | cope with all | cope with all | cope with all |
| 2.5 < ≦ 3.5 | 0 ≦ coping | 0 ≦ coping | 0 ≦ coping | cope with all |

The present invention has been described above using embodiments 1 and 2. In the first and second embodiments, the positive-edge data playback signal and the clock synchronized therewith were taken to be RDATA0 25 and RCLK0 27, and the negative-edge data playback signal and the clock synchronized therewith were taken to be RDATA1 26 and RCLK1 28. However, the clock combining circuit 2 of the present invention can obtain the same results even if the positive-edge data playback signal and the clock synchronized therewith are taken to be RDATA1 26 and RCLK1 28, and the negative-edge data playback signal and the clock synchronized therewith are taken to be RDATA0 25 and RCLK0 27.

In addition, the first and second embodiments were such that the design constants K, L, M and N of the clock combining circuit 2 were realized as N=L=3 and M=K=3. In order to obtain the capacity to cope with bit slips, it is desirable for the clock combining circuit 2 of the present invention to be designed with N≦L and M≦K, with the coping capacity higher the larger the difference between N and L and between M and K.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. An information playback apparatus that plays back user data from a recording medium, the information playback apparatus including a clock combining circuit comprising:

(a) a FIFO circuit that accepts:
   (i) a first-edge playback signal that has as data first edges of a playback signal obtained from recording domains formed in the recording medium, the first-edge playback signal being synchronized to a first-edge clock signal; and
   (ii) a second-edge playback signal that has as data second edges of the playback signal, the second-edge playback signal being synchronized to a second-edge clock signal; the FIFO circuit causing the first-edge playback signal and the second-edge playback signal to be synchronized to the first-edge clock signal so as to output a delayed first-edge playback signal and a delayed second-edge playback signal, the delayed second-edge playback signal being delayed by −KT to +LT, where K and L are integers and T is the clock period;

(b) a signal combining circuit that combines the delayed first-edge playback signal and the delayed second-edge playback signal and outputs (K+L+1) combined signals; and (c) a signal selecting circuit that detects marks in the playback signal, the marks being independent of the (K+L+1) combined signals, and outputs selected ones of the combined signals based on the detected marks.

2. The information playback apparatus of claim 1, wherein the FIFO circuit comprises:

an (N+1) bit first register that causes the first-edge playback signal to be delayed in synchronism with the first-edge clock signal, N being an integer;

(M+N) memory units, each having a write pointer and a read pointer, the (M+N) memory units store the second-edge playback signal in synchronism with the second-edge clock signal when the write pointer for the memory unit is ON, and output the stored second-edge playback signal in synchronism with the first-edge clock signal when the read pointer for the memory unit is ON, M being an integer; and a first ring counter and a second ring counter, the first and second ring counters each having (M+N) flip-flops connected in a ring shape;

the first ring counter having an Ith flip-flop set to ON and remaining flip-flops set to OFF when a reset signal is ON, I being an integer such that 0≦I<(M+N), the first ring counter shifting the flip-flop that is ON in synchronism with the second-edge clock signal when the reset signal is OFF, the outputs of each flip-flop being connected as the write pointers in a one-to-one correspondence with the (M+N) memory units;

the second ring counter having a Jth flip-flop set to ON and remaining flip-flops set to OFF when the reset signal is ON, J being the remainder of (I+N)/(M+N), the second ring counter shifting the flip-flop that is ON in synchronism with the second-edge clock signal when the reset signal is OFF, the outputs of each flip-flop being connected as the read pointers in a one-to-one correspondence with the (M+N) memory units.

3. The information playback apparatus of claim 2, wherein N≦L and M≦K.

4. The information playback apparatus of claim 3, wherein the reset signal is provided to the first and second ring counters from a source outside of the clock combining circuit.

5. The information playback apparatus of claim 4, further comprising:

a ring counter reset circuit that monitors which of the flip-flops in the first ring counter are set ON and monitors which of the flip-flops in the second ring counter are set ON, and sets an internal reset signal to ON when the flip-flops that are set ON in the first and second ring counters have a specific positional relationship, the ring counter reset circuit outputs to the first and second ring counters an OR output of the internal reset signal and the reset signal provided from the source outside of the clock combining circuit.

6. The information playback apparatus of claim 2, wherein the reset signal is provided to the first and second ring counters from a source outside of the clock combining circuit.

7. The information playback apparatus of claim 6, further comprising:

a ring counter reset circuit that monitors which of the flip-flops in the first ring counter are set ON and monitors which of the flip-flops in the second ring counter are set ON, and sets an internal reset signal to ON when the flip-flops that are set ON in the first and second ring counters have a specific positional relationship, the ring counter reset circuit outputs to the first and second ring counters an OR output of the internal reset signal and the reset signal provided from the source outside of the clock combining circuit.

8. The information playback apparatus of claim 7, wherein the signal combining circuit comprises:

a (K+1) bit second shift register that delays the delayed first-edge playback signal in synchronism with the first-edge clock signal;

a (K+L+1) bit third register that delays the delayed second-edge playback signal in synchronism with the first-edge clock signal; and (K+L+1) OR gates that combine the output of the second shift register and each of the (K+L+1) bits of the third shift register.

9. The information playback apparatus of claim 4, wherein the signal selection circuit comprises:

(K+L+1) mark detection circuits that detect specific mark patterns contained in the playback signal, the mark patterns being independent of each of the (K+L+1) combined signals, and output mark detection signals when the specific mark patterns are detected; and a multiplexer that outputs selected ones of the combined signals based on the mark detection signals output from the mark detection circuits.

10. The information playback apparatus of claim 7, wherein the signal selection circuit comprises:

(K+L+1) mark detection circuits that detect specific mark patterns contained in the playback signal, the mark patterns being independent of each of the (K+L+1) combined signals, and output mark detection signals when the specific mark patterns are detected; and a multiplexer that outputs selected ones of the combined signals based on the mark detection signals output from the mark detection circuits.

11. The information playback apparatus of claim 2, wherein the signal combining circuit comprises:

a (K+1) bit second shift register that delays the delayed first-edge playback signal in synchronism with the first-edge clock signal;

a (K+L+1) bit third register that delays the delayed second-edge playback signal in synchronism with the first-edge clock signal; and (K+L+1) OR gates that combine the output of the second shift register and each of the (K+L+1) bits of the third shift register.

12. The information playback apparatus of claim 2, wherein the signal selection circuit comprises:

(K+L+1) mark detection circuits that detect specific mark patterns contained in the playback signal, the mark patterns being independent of each of the (K+L+1) combined signals, and output mark detection signals when the specific mark patterns are detected; and a multiplexer that outputs selected ones of the combined signals based on the mark detection signals output from the mark detection circuits.

13. The information playback apparatus of claim 1, wherein the signal combining circuit comprises:

a (K+1) bit second shift register that delays the delayed first-edge playback signal in synchronism with the first-edge clock signal;

a (K+L+1) bit third register that delays the delayed second-edge playback signal in synchronism with the first-edge clock signal; and (K+L+1) OR gates that combine the output of the second shift register and each of the (K+L+1) bits of the third shift register.

14. The information playback apparatus of claim 1, wherein the signal selection circuit comprises:

(K+L+1) mark detection circuits that detect specific mark patterns contained in the playback signal, the mark patterns being independent of each of the (K+L+1) combined signals, and output mark detection signals when the specific mark patterns are detected; and a multiplexer that outputs selected ones of the combined signals based on the mark detection signals output from the mark detection circuits.

15. The information playback apparatus of claim 14, wherein each mark detection circuit performs a mark detection operation only when a detection window signal supplied to each mark detection circuit is ON.

16. The information playback apparatus of claim 14, wherein the mark detection circuits perform a mark detection operation when any of a plurality of detection window signals are ON, the detected mark pattern being changed by changing the detection window signals that are ON.

17. The information playback apparatus of claim 16, wherein specific ones of the mark detection circuits are turned OFF based on the detection window signals that are ON.

18. The information playback apparatus of claim 1, wherein the first-edge playback signal that uses as data the first edge of the playback signal obtained from the recording domains formed in the recording medium is a negative-edge playback signal and the first-edge clock signal to which the negative-edge playback signal is synchronized is a negative-edge clock signal; and the second-edge playback signal that uses as data the second edge of the playback signal is a positive-edge playback signal and the second-edge clock signal to which the positive-edge playback signal is synchronized is a positive-edge clock signal.

19. The information playback apparatus of claim 1, wherein the first-edge playback signal that uses as data the first edge of the playback signal obtained from the recording domains formed in the recording medium is a positive-edge playback signal and the first-edge clock signal to which the positive-edge playback signal is synchronized is a positive-edge clock signal; and the second-edge playback signal that uses as data the second edge of the playback signal is a negative-edge playback signal and the second-edge clock signal to which the negative-edge playback signal is synchronized is a negative-edge clock signal.

20. The information playback apparatus of claim 1, wherein the recording medium is an optical disk.

21. The information playback apparatus of claim 1, wherein the recording medium is an overwriteable magnetooptical disk.

22. The information playback apparatus of claim 1, further comprising a data decoding circuit, and wherein the signal selecting circuit outputs the selected ones of the combined signals to the data decoding circuit.

23. A method of playing back user data from a recording medium, the method comprising the steps of:
  (a) accepting a first-edge playback signal that has as data first edges of a playback signal obtained from recording domains formed in the recording medium, the first-edge playback signal being synchronized to a first-edge clock signal;
  (b) accepting a second-edge playback signal that has as data second edges of the playback signal, the second-edge playback signal being synchronized to a second-edge clock signal;
  (c) synchronizing the first-edge playback signal and the second-edge playback signal to the first-edge clock signal in a FIFO circuit, the FIFO circuit outputting a delayed first-edge playback signal and a delayed second-edge playback signal, the delayed second-edge playback signal being delayed by −KT to +LT, where K and L are integers and T is the clock period;
  (d) combining the delayed first-edge playback signal and the delayed second-edge playback signal in a signal combining circuit, the signal combining circuit outputting (K+L+1) combined signals; and
  (e) detecting marks in the playback signal using a signal selecting circuit, the marks being independent of the (K+L+1) combined signals, the signal selecting circuit outputting selected ones of the combined signals based on the detected marks.

24. The method of claim 23, wherein the FIFO circuit performs the synchronizing step by:

delaying the first-edge playback signal in synchronism with the first-edge clock signal in an (N+1) bit first register, N being an integer;

storing the second-edge playback signal in synchronism with the second-edge clock signal in (M+N) memory units, each having a write pointer and a read pointer, the storing occurring when the write pointer for the memory unit is ON, M being an integer;

outputting the stored second-edge playback signal in synchronism with the first-edge clock signal from the (M+N) memory units when the read pointer for the memory unit is ON;

controlling the states of the write pointers and the read pointers using a first ring counter and a second ring counter, the first and second ring counters each having (M+N) flip-flops connected in a ring shape; the first ring counter setting an Ith flip-flop to ON and remaining flip-flops to OFF when a reset signal is ON, I being an integer such that 0≦I<(M+N), the first ring counter shifting the flip-flop that is ON in synchronism with the second-edge clock signal when the reset signal is OFF, the outputs of each flip-flop being connected as the write pointers in a one-to-one correspondence with the (M+N) memory units; the second ring counter setting a Jth flip-flop to ON and remaining flip-flops to OFF when the reset signal is ON, J being the remainder of (I+N)/(M+N), the second ring counter shifting the flip-flop that is ON in synchronism with the second-edge clock signal when the reset signal is OFF, the outputs of each flip-flop being connected as the read pointers in a one-to-one correspondence with the (M+N) memory units.

25. The method of claim 24, wherein N≦L and M≦K.

26. The method of claim 24, wherein the reset signal is provided to the first and second ring counters from a source outside of the clock combining circuit.

27. The method of claim 26, further comprising:
  monitoring which of the flip-flops in the first ring counter are set ON and monitoring which of the flip-flops in the second ring counter are set ON, in a ring counter reset circuit, the ring counter reset circuit setting an internal reset signal to ON when the flip-flops that are set ON in the first and second ring counters have a specific positional relationship, the ring counter reset circuit outputting to the first and second ring counters an OR output of the internal reset signal and the reset signal provided from the source outside of the clock combining circuit.

28. The method of claim 23, wherein the signal combining circuit combines the delayed first-edge playback signal and the delayed second-edge playback signal by:
  delaying the delayed first-edge playback signal in synchronism with the first-edge clock signal in a (K+1) bit second shift register;
  delaying the delayed second-edge playback signal in synchronism with the first-edge clock signal in a (K+L+1) bit third register; and
  combining the output of the second shift register and each of the (K+L+1) bits of the third shift register in (K+L+1) OR gates.

29. The method of claim 23, wherein the signal selection circuit outputs selected ones of the combined signals by:
  detecting specific mark patterns contained in the playback signal using (K+L+1) mark detection circuits, the mark patterns being independent of each of the (K+L+1) combined signals, the (K+L+1) mark detection circuits outputting mark detection signals when the specific mark patterns are detected; and selecting ones of the combined signals based on the mark detection signals output from the mark detection circuits using a multiplexer.

30. The method of claim 29, wherein each mark detection circuit performs a mark detection operation only when a detection window signal supplied to each mark detection circuit is ON.

31. The method of claim 29, wherein the mark detection circuits perform a mark detection operation when any of a plurality of detection window signals are ON, the detected mark pattern being changed by changing the detection window signals that are ON.

32. The method of claim 31, wherein specific ones of the mark detection circuits are turned OFF based on the detection window signals that are ON.

33. The method of claim 23, wherein the FIFO circuit accepts a negative-edge playback signal as the first-edge playback signal, a negative-edge clock signal as the first-edge clock signal, a positive-edge playback signal as the second-edge playback signal, and a positive-edge clock signal as the second-edge clock signal.

34. The method of claim 23, wherein the FIFO circuit accepts a positive-edge playback signal as the first-edge playback signal, a positive-edge clock signal as the first-edge clock signal, a negative-edge playback signal as the second-edge playback signal, and a negative-edge clock signal as the second-edge clock signal.

35. The method of claim 23, wherein the signal selecting circuit outputs the selected ones of the combined signals to a data decoding circuit.

* * * * *